(12) United States Patent
Chung

(10) Patent No.: US 12,428,155 B2
(45) Date of Patent: Sep. 30, 2025

(54) IN-CABIN PARTITION OF MOBILITY VEHICLE

(71) Applicants: Hyundai Motor Company, Seoul (KR); Kia Corporation, Seoul (KR)

(72) Inventor: Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/197,306

(22) Filed: May 15, 2023

(65) Prior Publication Data

US 2024/0199209 A1 Jun. 20, 2024

(30) Foreign Application Priority Data

Dec. 16, 2022 (KR) .................. 10-2022-0177536

(51) Int. Cl.
 *B64D 11/00* (2006.01)
(52) U.S. Cl.
 CPC ................ *B64D 11/0023* (2013.01)
(58) Field of Classification Search
 CPC ........... B64D 11/0023; B64D 11/0606; B64D 11/0696; B64C 1/10
 See application file for complete search history.

(56) References Cited

U.S. PATENT DOCUMENTS

| | | | |
|---|---|---|---|
| 5,482,230 A | 1/1996 | Bird et al. | |
| 5,816,534 A * | 10/1998 | Schumacher | B64D 11/0023 244/119 |
| 7,232,094 B2 * | 6/2007 | Bishop | B64D 11/0696 244/118.6 |
| 9,783,280 B2 | 10/2017 | Llamas Sandin et al. | |
| 10,252,809 B2 | 4/2019 | Cabourg | |
| 10,479,227 B2 * | 11/2019 | Nolte | B60N 2/42736 |
| 11,584,259 B2 * | 2/2023 | Cantos | B64D 11/0696 |
| 11,639,625 B2 * | 5/2023 | Chi-Hsueh | E05F 15/73 49/334 |
| 2009/0072580 A1 * | 3/2009 | Wojtach, Jr. | E05F 15/53 296/146.4 |
| 2019/0337623 A1 * | 11/2019 | Vaninetti | B64D 11/0023 |
| 2021/0347485 A1 | 11/2021 | Papke et al. | |

FOREIGN PATENT DOCUMENTS

| | | |
|---|---|---|
| EP | 3741676 B1 | 12/2021 |
| JP | H11030473 A | 2/1999 |
| JP | 2002357058 A | 12/2002 |
| JP | 2007331628 A | 12/2007 |
| JP | 2013002259 A | 1/2013 |
| KR | 10-2014-0126217 A | 10/2014 |
| KR | 101588379 B1 | 1/2016 |

OTHER PUBLICATIONS

Feb. 19, 2024—(EP) Extended European Search Report—App 23198212.5.

\* cited by examiner

*Primary Examiner* — Richard Green
(74) *Attorney, Agent, or Firm* — Banner & Witcoff, Ltd.

(57) ABSTRACT

An in-cabin partition of a mobility vehicle may allow for automatically adjusting the size of a space for passengers and cargo according to circumstances and needs. The in-cabin partition may include at least one rail installed in a cabin, a slider movably installed on the rail, a rotary shaft rotatably installed on the slider, and a partition body connected to the rotary shaft. The partition body may be configured to be rotatable with the rotary shaft.

13 Claims, 9 Drawing Sheets

IN-CABIN PARTITION OF MOBILITY VEHICLE

CROSS-REFERENCE TO RELATED APPLICATION (S)

This application claims benefit of priority to Korean Patent Application No. 10-2022-0177536 filed on Dec. 16, 2022 in the Korean Intellectual Property Office, the disclosure of which is incorporated herein by reference in its entirety.

TECHNICAL FIELD

The present disclosure relates to an in-cabin partition of a mobility vehicle for automatically adjusting the size of a space for passengers and cargo according to circumstances and needs.

BACKGROUND

Efficient passenger boarding and cargo loading are required to maximize the number of aircraft flights performed at a given time. The aircraft should be designed to optimally use an interior space with respect to the number of passengers and cargo capacity.

Conventional commercial aircraft may include an upper deck that is almost exclusively used for transporting passengers, and a lower deck that is exclusively used for transporting cargo.

However, even if aircraft are configured with a double deck, it is impossible to utilize extra or unoccupied room in a cabin or an upper deck so as to carry more cargo, for example, in a flight with few or no passengers.

SUMMARY

The following summary presents a simplified summary of certain features. The summary is not an extensive overview and is not intended to identify key or critical elements.

Systems, apparatuses, and methods are described for an in-cabin partition and operation thereof. The in-cabin partition may comprise at least one rail installed in a cabin.

a slider movably coupled to the rail, a rotary shaft rotatably coupled to the slider, and a partition body connected to the rotary shaft and configured to be rotatable with the rotary shaft.

Also, or alternatively, the in-cabin partition may comprise at least one rail installed in a cabin, a plurality of sliders movably coupled to the rail, a casing positioned over the plurality of sliders, a rotary shaft rotatably coupled to the casing, and a partition body connected to the rotary shaft and configured to be rotatable with the rotary shaft.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1A:
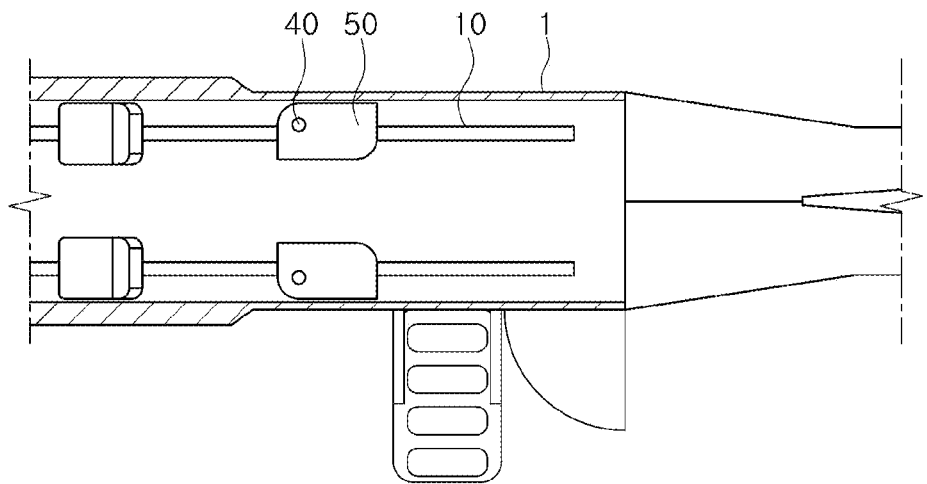
FIGS. 1A and 1B are views illustrating an example in which an in-cabin partition is applied according to a first example of the present disclosure.

Hereinafter, some aspects of the present disclosure will be described in detail with reference to the accompanying drawings. In designating elements of the drawings by reference numerals, the same elements will be designated by the same reference numerals although they are shown in different drawings.

For convenience of description, the present disclosure is described as an exemplary application to an air mobility vehicle with a cabin, but the present disclosure is not necessarily limited thereto. For example, the present disclosure may be applied to any mobility vehicle (e.g., an air mobility vehicle, a water or underwater mobility vehicle, a land mobility vehicle, an all- or multi-terrain mobility vehicle, etc.) with a cabin or an interior.

In addition, it will be understood that, although the terms first, second, etc., may be used herein to describe various elements, these elements should not be limited in order, size, location, or importance by these terms, and these terms are only used to distinguish one element from another.

Figure 1B:
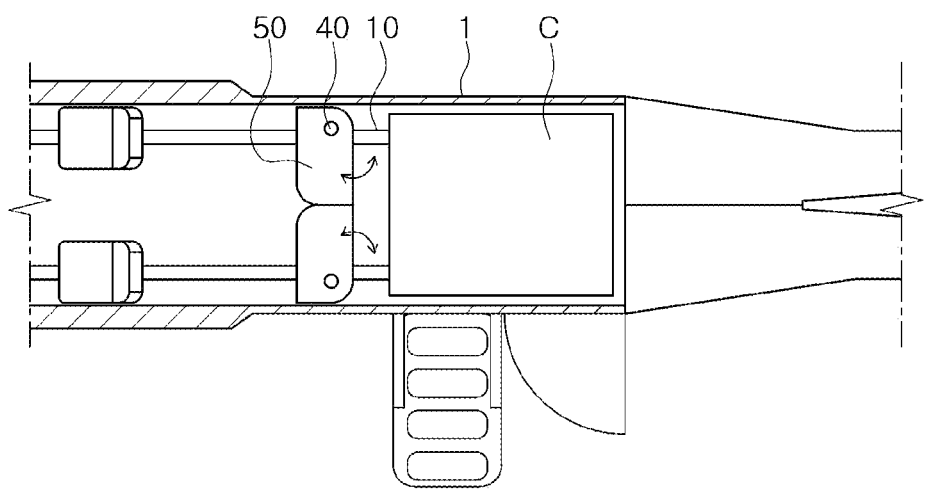
Figure 2:
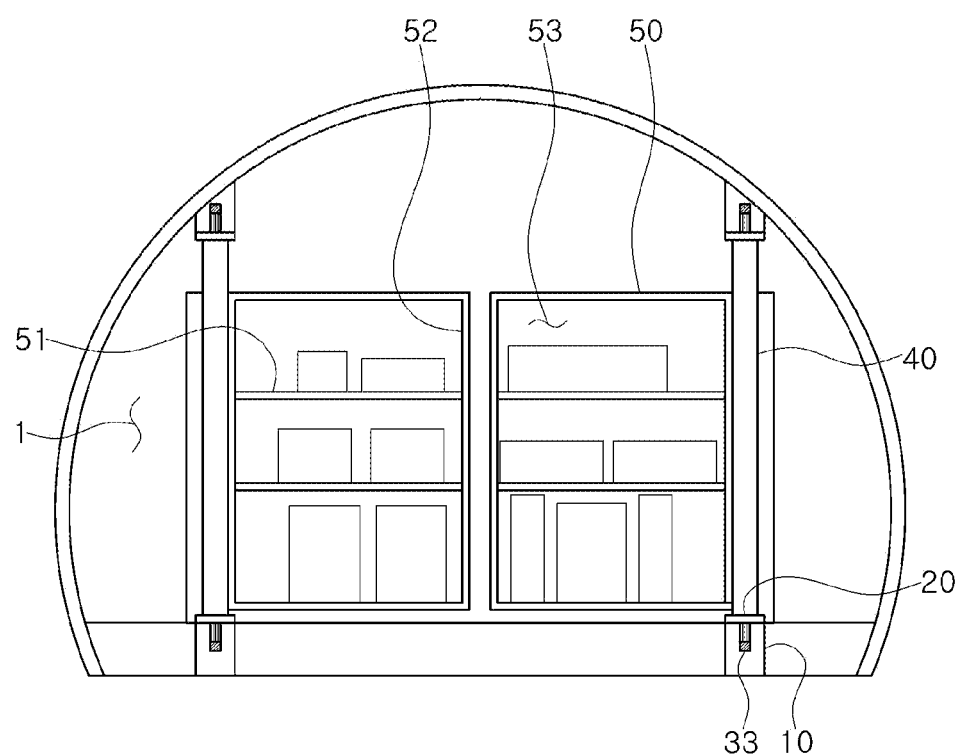
FIG. 2 is a front view of the in-cabin partition according to the first example of the present disclosure.
Figure 3A:
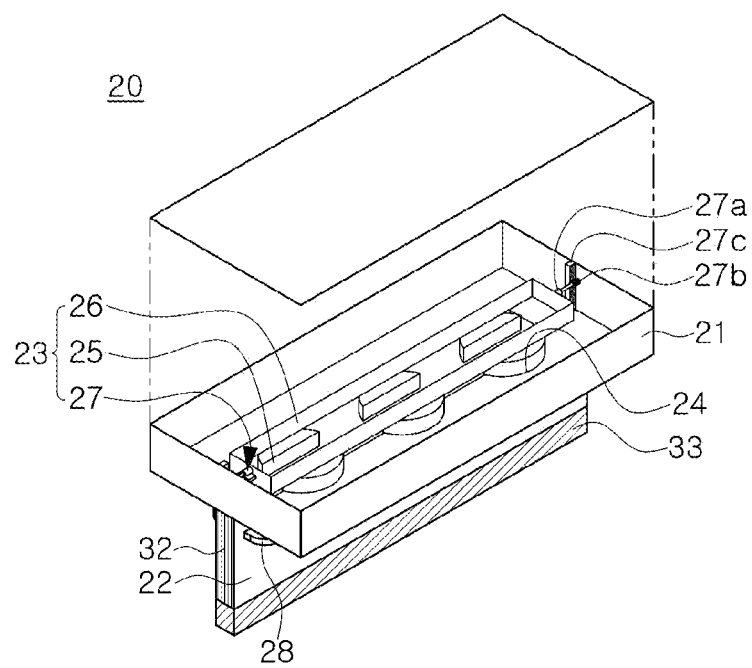
FIGS. 3A and 3B are perspective views illustrating a first driver.
Figure 3B:
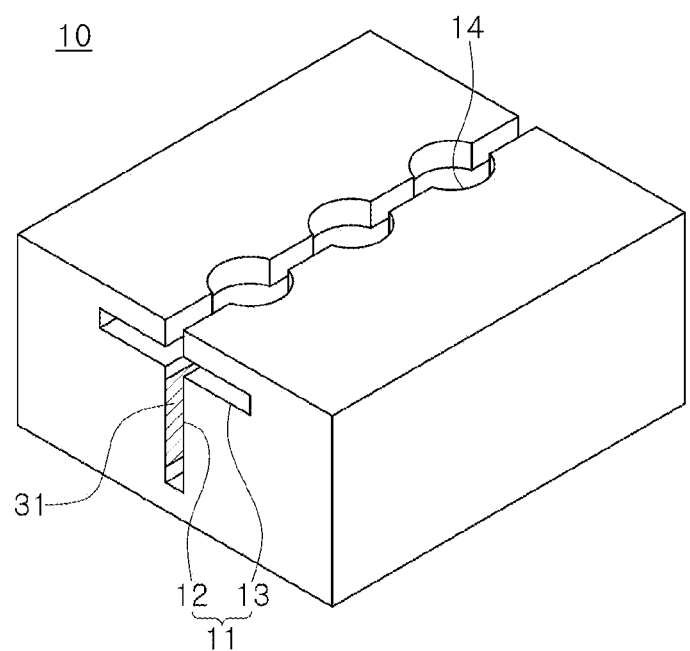
Figure 4:
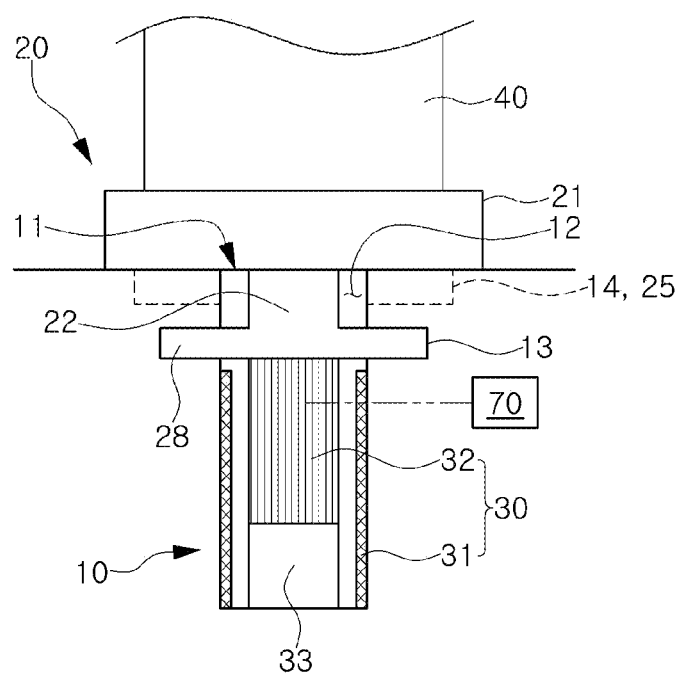
FIG. 4 is a cross-sectional view illustrating the first driver.

FIGS. 1A and 1B are views illustrating an example in which an in-cabin partition is applied according to a first example of the present disclosure, FIG. 2 is a front view of the in-cabin partition according to the first example of the present disclosure, and FIGS. 3A and 3B are perspective views illustrating a first drive, where FIG. 3A is a perspective view of a slider, and FIG. 3B is a perspective view of a rail. FIG. 4 is a cross-sectional view illustrating the first driver.

The in-cabin partition according may include at least one rail 10, a slider 20, a rotary shaft 40 and a partition body 50 (see, e.g., FIGS. 1A-1B).

At least one rail 10 may be disposed on a floor of a cabin 1 in a longitudinal direction of the cabin 1 (e.g., in a front to rear direction of the vehicle. The rail 10 may be at least partially formed of a conductive material such as a metal. The rail 10 may include a groove 11 formed to extend in the longitudinal direction of the rail 10 (e.g., see FIG. 4).

Referring to FIG. 4, for example, as the groove 11 may have a substantially cross-shaped cross-section (e.g., for a cross-section perpendicular to the longitudinal direction at least in part), the groove 11 may include a main groove 12 and a separation prevention groove 13 formed in a direction crossing the main groove and extending in a longitudinal direction of the rail 10. The main groove 12 may be exposed externally through an opening in a surface of the rail 10, the opening being contiguous with the groove.

In addition, a plurality of locking grooves 14 spaced apart from each other at intervals in the longitudinal direction of the rail 10 may be formed in at least one edge of the groove 11 (e.g., an edge contiguous with the opening in the surface of the rail 10).

Although an example in which the at least one rail 10 is disposed on the floor of the cabin 1 is illustrated and described, the present disclosure is not limited thereto. For example, the rail may be installed on the ceiling or a sidewall of the cabin 1. FIG. 2 illustrates an example in which a plurality of rails are installed on both the ceiling and the floor of the cabin 1.

In the in-cabin partition according to the first example of the present disclosure, the rail 10 may serve to guide a movement of the partition body 50 and form (e.g., serve as) a portion of a first driver 30, which may be configured to provide moving force to the partition body 50. Furthermore, the rail 10 may be electrically connected to a power source and may be configured to allow a current to flow through the rail 10 so that a current may be applied to a coil of the first driver 30 through the slider 20.

The slider 20 may be inserted into the rail 10 (e.g., into the main groove 12 of the groove 11) and may slide forwards and backwards in the longitudinal direction of the rail 10 in the groove 11 of the rail 10.

To this end, the slider 20 may have a cross-sectional shape corresponding to a cross-sectional shape of the groove 11 of the rail 10. For example, the slider 20 may be formed to be substantially T-shaped. Accordingly, the slider 20 may include a support 21 (e.g., a substantially flat support 21) configured to support the rotary shaft 40 and an insertion portion 22 connected to the support 21 in an orthogonal direction and configured to be inserted into the main groove 12 of the groove 11.

At least the support 21 may be formed to have a hollow portion, and may include a position fixing unit 23 installed to appear outside or disappear inside the hollow portion. To this end, at least one through-hole 24 may be formed in one side surface of the support 21.

The position fixing unit 23 may include at least one stud 25, a frame 26 connected to the stud 25, and a third driver 27 installed in the hollow portion of the support 21 to provide driving force for moving the frame 26.

The stud 25 may be, for example, a pillar member (e.g., a pillar) with a substantially semicircular cross-section, and may be inserted into the corresponding locking groove 14 while being shape-fitted to one of the plurality of locking grooves 14 of the rail 10. However, the shape of the stud 25 is not necessarily limited thereto and may have any other polygonal, elliptical, etc., cross-sectional shape.

The frame 26 may be configured to connect the stud 25 and the third driver 27. The frame 26 may be configured to serve as a stopper for preventing the stud 25 from being completely separated from the support 21 through the through-hole 24. In addition, when a plurality of studs 25 are provided, the frame 26 may connect the plurality of studs 25 so that these studs 25 can move integrally.

A rack and a pinion mechanism may be adopted as at least a part of the third driver 27. For example, the third driver 27 may include a motor 27a installed in the frame 26, a pinion gear 27b connected to a motor shaft of the motor 27a, and a rack gear 27c installed in the hollow portion of the support 21 to engage with the pinion gear.

When the pinion gear 27b connected to the motor shaft of the motor 27a rotates with the driving force of the motor, the pinion gear 27b moves along the rack gear 27c while rotating by engaging with the rack gear 27c. Accordingly, the stud 25 may protrude from the support 21 through the through-hole 24 while the frame 26 and at least one stud 25 move along with the movement of the pinion gear 27b.

The protruding stud 25 may be inserted into the corresponding locking groove 14 while being shape-fitted to one of the plurality of locking grooves 14 of the rail 10. Accordingly, the position of the slider 20 with respect to the rail 10 may be fixed.

The motor 27a may rotate forwards and backwards according to an application of power. The stud 25 may reciprocate with driving force according to the operation of the motor 27a, and the stud 25 may protrude from a surface of the support 21 or may be immersed in the hollow portion of the support 21 based on the driving of the motor causing the stud 25 to move up or down.

The third driver 27 may be provided in pairs to implement a stable operation of the stud 25 (e.g., on either side of the stud 25). Here, the configuration of the third driver 27 is not limited to the above-described example. For example, a fluid pressure cylinder such as a pneumatic cylinder, and/or an electric actuator such as a solenoid actuator, having an operating rod, or any other driver capable of causing a stud 25 to move into or out of the locking groove 14 may be adopted as the third driver 27.

In addition, the insertion portion 22 may include a separation prevention portion 28 that protrudes in a direction crossing (at least in part) a movement direction of the slider 20 and configured to be insertable into the separation prevention groove 13 of the groove 11.

The separation prevention portion 28 and the separation prevention groove 13 may form a means for preventing the slider 20 from being separated from the rail 10 (e.g., in a height direction of the cabin when the in-cabin partition according to the first example of the present disclosure is applied to the floor or the ceiling of the cabin 1 of the mobility vehicle).

Accordingly, this may allow the in-cabin partition to be continuously and stably supported by the floor or the ceiling of the cabin 1 for any movement of the mobility vehicle.

In the in-cabin partition according to the first example of the present disclosure, the rail 10 and the slider 20 may form a portion of the first driver 30. For example, the first driver 30 of the in-cabin partition according to the first example of the present disclosure may adopt a linear motor.

To this end, a plurality of permanent magnets 31 may be arranged on an internal wall of the rail 10 in the longitudinal direction of the rail 10, and coils 32 may be wound or stacked on the insertion portion 22 of the slider 20.

The plurality of permanent magnets 31 may be disposed on each internal wall of the rail 10 (see, e.g., FIG. 3B). The plurality of permanent magnets 31 may be disposed such that different polarities may be alternately arranged, but may be aligned with permanent magnets 31 on the opposite inner wall such that the magnet portions having the same polarity may face each other. Each of the permanent magnets 31 may be fixed to the rail 10 using any suitable technology, such as, for example, an adhesive, a fastener, or the like.

The coils 32 may be wound and/or stacked on the insertion portion 22 of the slider 20. The coils 32 may be wound and/or stacked so as to form a magnetic void therebetween, which may be oriented so as to face the surfaces of the permanent magnets 31. An appropriate current for the position of the permanent magnet may be applied to the coil at every phase to generate magnetic flux around the coil, and such magnetic flux may interact with a magnetic flux of the permanent magnet, thus generating electromagnetic force, that is, a moving force. Accordingly, the slider 20 may be linearly movable in the rail 10.

The coils 32 and the permanent magnets 31 may not be in physical contact with each other. A change in the magnetic flux may occur when a current flows through the coils 32, and accordingly, the moving force may be generated between the coils 32 and the permanent magnets 31.

For example, a current may have a positive (+) value, zero (0), and/or a negative (−) value (e.g., varying at regular intervals). The direction of the current in the coil 32 may be applied to generate positive moving force in all coils 32 in consideration of a direction of the magnetic flux generated by the permanent magnet 31. Accordingly, a linear movement may be performed in a single direction. To achieve a reverse movement, a current for generating negative movement force may be provided to all or a portion of the coils 32.

In the in-cabin partition according to the first example of the present disclosure, the permanent magnet 31 may be installed on the rail 10 to fix a position thereof, and the coils 32 may be disposed on the slider 20 to move the slider 20, but the present disclosure is not limited thereto, and the coils 32 and the permanent magnets 31 may be disposed opposite to each other so that the permanent magnets 31 may move with the slider 20 and the coils 32 stay fixed to the rail 10 (or any combination thereof).

The in-cabin partition according to the first example of the present disclosure may selectively further include a connection terminal 33, mounted on the slider 20 so as to be disposed between the rail 10 and the slider 20. The connection terminal 33 may be configured to slide in contact with the rail 10, and may be electrically connected to the rail 10, through which the current flows.

The connection terminal 33 may be formed of a conductor made of a material having excellent electrical conductivity, and/or may be fixedly installed in an end of the insertion portion 22 of the slider 20. The connection terminal 33 may be installed using any suitable technology, such as an adhesive and/or a fastener. The connection terminal 33 may be electrically connected to the coil 32.

Accordingly, within the rail 10, which may be electrically connected to a power source (not illustrated) and through which current may flow from the power source, the connection terminal 33 may slide with the slider 20 to continuously come into contact with an internal surface of the rail 10, and through such contact, the connection terminal 33 may transmit the current applied from the rail 10 to the coil 32 and supply the power source to the first driver 30.

Referring back to FIGS. 1A, 1B and 2, the rotary shaft 40 may comprise a tubular member (e.g., a tube) that can be installed on the slider 20, for example, with a substantially circular cross-section. In the in-cabin partition according to the first example of the present disclosure, the rotary shaft 40 may be installed upright on the slider 20. For example, in order to implement stable support and operation of the rotary shaft 40, each of the sliders 20 may be disposed in opposite ends of a single rotary shaft 40.

A bearing (not illustrated) rotatably supporting the rotary shaft 40 may be installed between an end of the rotary shaft 40 and the slider 20. In addition, a ring gear 63 may be formed on a portion of an inner circumferential surface of the rotary shaft 40. The ring gear 63 is relevant to the second driver 60.

The partition body 50 may be formed of, for example, a substantially plate-shaped member having a predetermined thickness. However, the shape of the partition body 50 is not necessarily limited thereto and may be formed to have any other shape.

For example, the partition body 50 may comprise a plurality of horizontal frames 51 and a plurality of vertical frames 52 and may form a plurality of storage spaces 53. A passenger's baggage may be accommodated in the storage spaces 53.

In addition, a lighting fixture, a refrigerator, or a heating device may be installed in the partition body 50. The power of such electric appliances may be obtained through the connection terminal 33 in contact with the rail 10 through which current may flow.

One end of the partition body 50 may be fixedly coupled to the rotary shaft 40 using any suitable technique, such as welding or a fastener. Accordingly, the partition body 50 may perform a rotational motion corresponding to yawing around the rotary shaft 40.

As illustrated in FIGS. 1A, 1B and 2, the in-cabin partitions according to the first example of the present disclosure may be installed one by one on both lateral sides of the cabin 1 and may be rotatably disposed around the rotary shaft 40, and accordingly, a pair of partitions may act as a door to open and close a corridor in the cabin 1.

Figure 5:
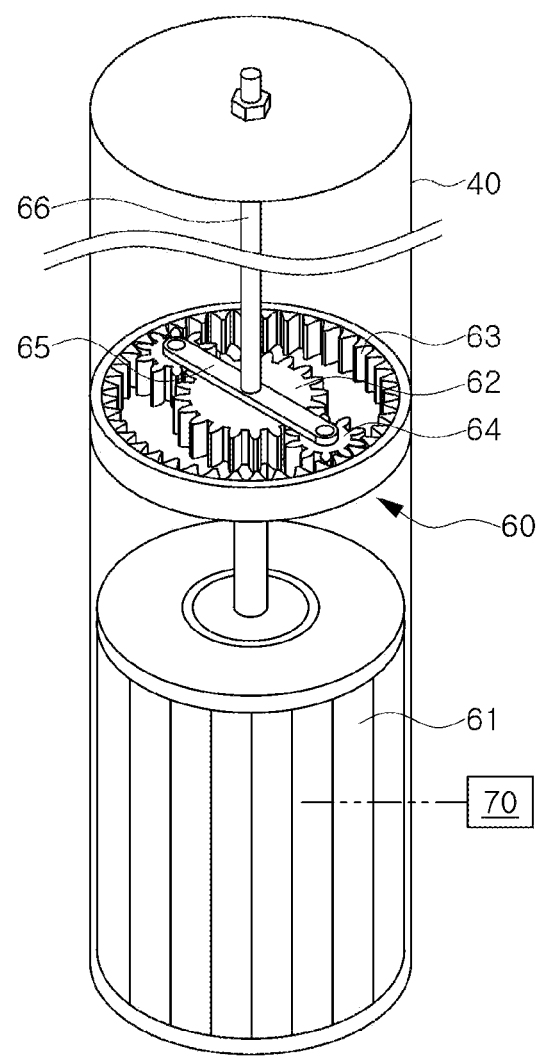
FIG. 5 is a perspective view illustrating a rotary shaft along with a second driver.

FIG. 5 is a perspective view illustrating the rotary shaft along with the second driver.

A planetary gear mechanism may be adopted as the second driver 60 of the in-cabin partition according to the first example of the present disclosure. For example, the second driver 60 may include a drive motor 61 installed on the slider 20, a sun gear 62 connected to the motor shaft of the drive motor, a ring gear 63 formed on an inner circumference of the rotary shaft 40, a plurality of planetary gears 64 that rotate the ring gear 63 while the sun gear 62 and the ring gear 63 are engaged, and a carrier 65 configured to connect these planetary gears and having a fixed position within the rotary shaft 40 by a shaft member 66.

The drive motor 61 may be disposed adjacent to one end of the rotary shaft 40 on which the ring gear 63 is formed. In this case, the shaft member 66 for fixing the carrier 65 may be fixedly coupled to the other end of the rotary shaft 40 using any suitable technique, such as welding or a fastener.

The drive motor 61 may be electrically connected to the connection terminal 33. Accordingly, within the rail 10 electrically connected to the power source (not illustrated) and through which the current flows from the power source, the connection terminal 33 may slide with the slider 20, so as to continuously come into contact with an internal surface of the rail 10. Through such contact, the connection terminal 33 may transmit the current applied from the rail 10 to the drive motor and supply the current from the power source to the second driver 60.

Each of the plurality of planetary gears 64 that rotate by engaging with a tooth-shaped portion formed on an outer circumferential surface of the sun gear 62 may be mounted in the carrier 65 so as to freely rotate, and may be disposed to engage with the ring gear 63.

As a result, when the sun gear 62 connected to the motor shaft of the drive motor 61 is used as an input shaft and the ring gear 63 is used as an output shaft, the planetary gears 64 whose positions are fixed rotate between the sun gear 62 and the ring gear 63 with the rotation of the sun gear 62, and the ring gear 63 may rotate along, thereby rotating the rotary shaft 40 integrated with the ring gear 63.

A reduction ratio indicated by the number of teeth of the ring gear 63 and the number of teeth of the sun gear 62 may be obtained.

With the rotation of the rotary shaft 40 in this manner, the partition body 50 fixedly coupled to the rotary shaft 40 may rotate as described above, thus opening and closing the corridor in the cabin 1.

The in-cabin partition according to the first example of the present disclosure may further include a controller 70 configured to control operations of the first driver 30, the second driver 60, and/or the third driver 27. The controller 70 may control the first driver 30, the second driver 60, and/or the third driver 27 so as to selectively move and/or rotate the in-cabin partition.

The controller 70 may be communicatively connected to the first driver 30, the second driver 60, and/or the third driver 27 through one or more of a wired communicative connection or a wireless communicative connection. For example, the controller 70 may transmit a control signal to one or more of the drivers 30, 60 or 27 via a controller area network (CAN).

The controller 70 may be implemented as a computing device, such as a processor (e.g., a microprocessor) having a memory. The memory may store an algorithm for controlling components of one or more of the drivers 30, 60 or 27. Specifically, the memory may store instructions to cause an operation of the corresponding motor, and/or may store data for a program reproducing the algorithm. The processor may perform control of the components of one or more of the drivers 30, 60 or 27 (specifically, the corresponding motor) using data stored in the memory, e.g., by executing instructions to implement the algorithm (s).

In addition, the controller 70 may be merged with and/or used in, for example, a control system of the mobility vehicle. The controller 70 may control an overall operation of the in-cabin partition according to the first example of the present disclosure.

Before operation of the mobility vehicle (e.g., before executing transportation of passengers and/or cargo), a layout of the cabin 1 may be changed and an internal space of the cabin 1 may be redistributed and reconstructed, depending on the number of passengers or the capacity of a cargo C, which may be input to the controller 70 in advance of the operation. Some of passenger seats may be removed and/or a volume of the seat may be reduced by folding a cushion thereof upward. Conversely, some of the passenger seats may be added or a gap between seat rows may be adjusted so as to accommodate more passengers.

After the space for passengers is adjusted as described above, the controller 70 may control the first driver 30 of the in-cabin partition to move the in-cabin partition along the rail 10 (e.g., linearly) so that the in-cabin partition may be placed in an appropriate position within the cabin 1. After the position of the in-cabin partition is determined, the controller 70 may control the third driver 27 to operate the stud 25, thereby fixing the position of the in-cabin partition.

Also, or alternatively, the controller 70 may control the second driver 60 to rotate the in-cabin partition so as to open the corridor in the cabin 1 (e.g., for passenger boarding). The controller 70 may control the second driver 60 so that the in-cabin partition may close the corridor (e.g., after passenger boarding is completed). The cargo C may be loaded in the remaining space in the cabin.

According to the in-cabin partition according to the first example of the present disclosure, the time and process required for changing the layout in the cabin of the mobility vehicle may be significantly reduced.

Figure 6A:
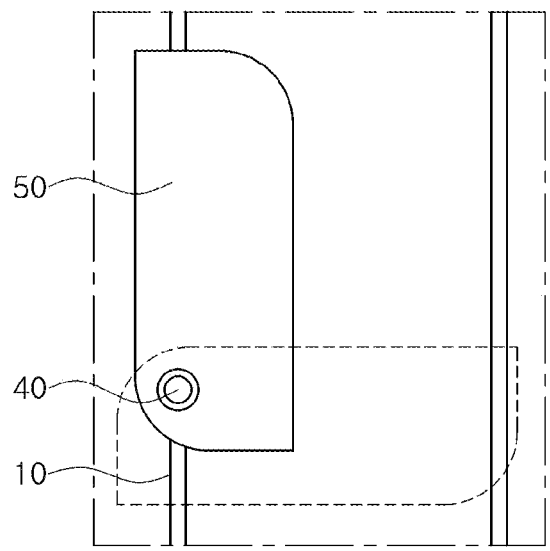
FIGS. 6A and 6B are views illustrating a modification of the first example of the present disclosure.
Figure 6B:
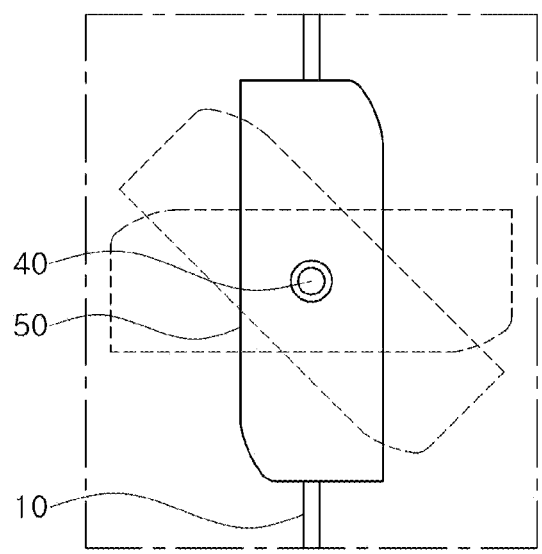

FIGS. 6A and 6B are views illustrating a modification of the first example of the present disclosure. The modified example illustrated in FIGS. 6A and 6B illustrates that when the cabin 1 is narrow in a width direction, the in-cabin partition may be arranged in a single-door type so as to open and close the corridor.

In FIG. 6A, the rotary shaft 40 may be disposed on one side of the partition body 50, and the partition body 50 may be rotated based on one side thereof. In this case, the in-cabin partition may operate like a single door to open and close the corridor in the cabin 1. The in-cabin partition may rotate up to 180 degrees.

In FIG. 6B, the rotary shaft 40 may be disposed in the center of the partition body 50, and the partition body 50 may be rotated around the center thereof. In this case, the in-cabin partition may operate like a rotating door to open and close the corridor in the cabin 1. The in-cabin partition may rotate up to 360 degrees.

Figure 7A:
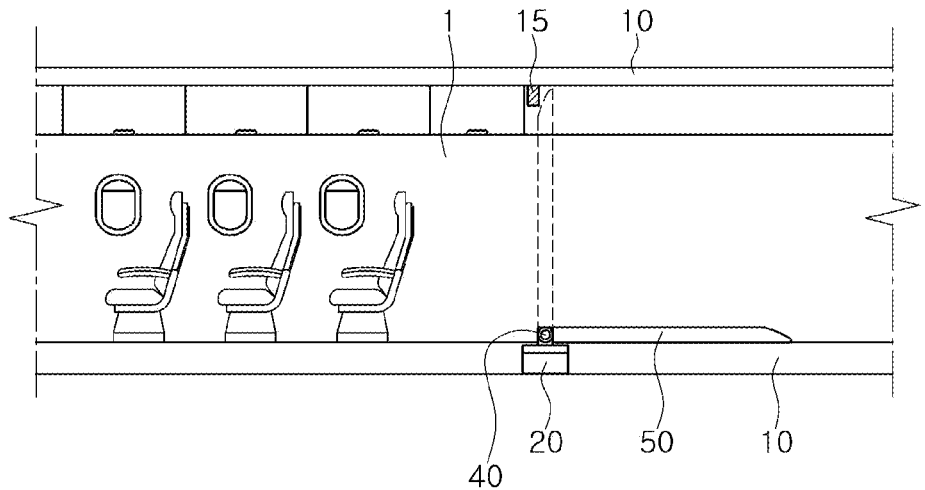
FIGS. 7A and 7B are views illustrating the in-cabin partition applied according to a second example of the present disclosure.
Figure 7B:
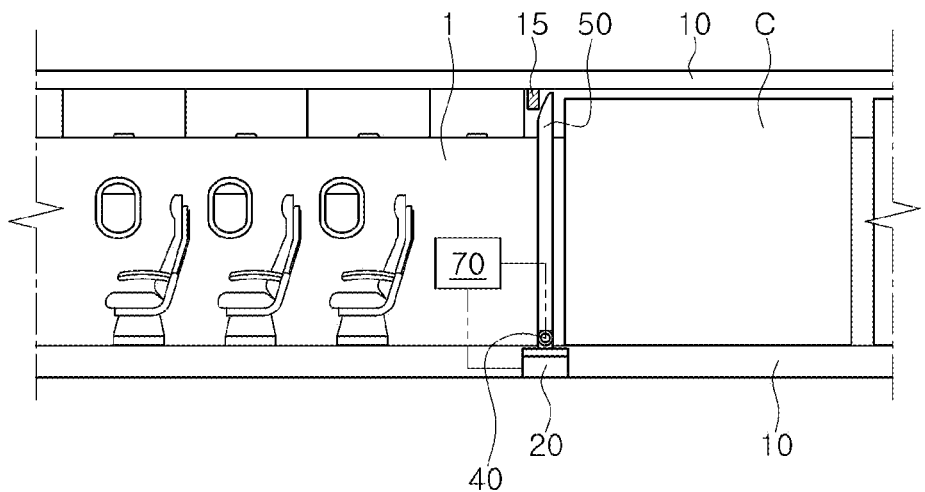
Figure 8:
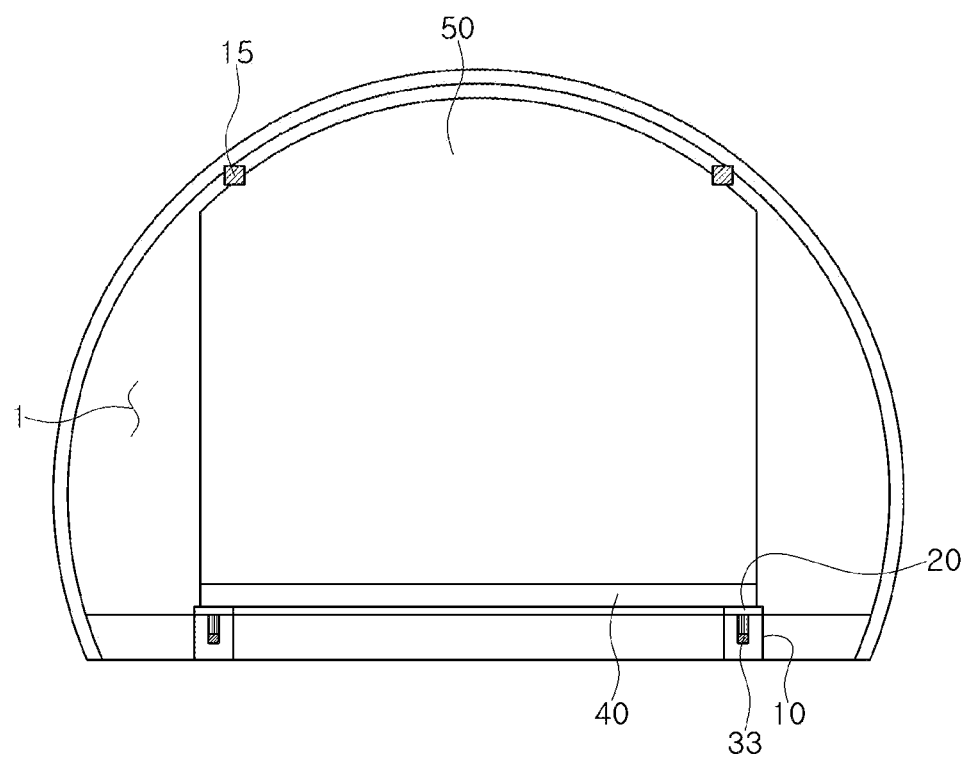
FIG. 8 is a front view of the in-cabin partition according to the second example of the present disclosure.

FIGS. 7A and 7B are views illustrating an example in which the in-cabin partition is applied according to a second example of the present disclosure, and FIG. 8 is a front view of the in-cabin partition according to the second example of the present disclosure.

The in-cabin partition according to the second example of the present disclosure may include at least one rail 10, the slider 20, the rotary shaft 40, and the partition body 50.

The second example illustrated in FIGS. 7A, 7B and 8 is different from the first example only in an arrangement relationship of the rotary shaft 40 and a rotation direction of the partition body 50, and the remaining components in the second example are the same as those of the first example. Accordingly, in describing the in-cabin partition of the second example, the same reference numerals as the first example are assigned to the same components as the components of the in-cabin partition according to the first example described above, and details of a configuration and a function thereof will be omitted.

At least one rail 10 may be disposed on the floor of the cabin 1 in the longitudinal direction of the cabin 1.

In the in-cabin partition according to the second example of the present disclosure, the rail 10 may not only serve to guide the movement of the partition body 50, but also may form a portion of the first driver 30 to provide a moving force to the partition body 50. Furthermore, the rail 10 may be electrically connected to the power source and configured to allow a current to flow through the rail 10 so that a current may be applied to a coil 32 of the first driver 30 through the slider 20.

The rail 10 may be installed on a ceiling or a sidewall of the cabin 1. In addition, optionally, a plurality of holders 15 may be disposed on the rail 10 at regular intervals in the longitudinal direction of the cabin 1. When the partition body 50 rotates and comes into contact with one of the holders 15, the partition body 50 may be prevented from rotating at a predetermined angle or more.

The slider 20 may be inserted into the rail 10. That is, the slider 20 may be inserted into the main groove 12 of the groove 11, and may be able to slide forwards and/or backwards in the groove 11 of the rail 10 in the longitudinal direction of the rail 10.

To this end, the slider 20 may have a cross-sectional shape corresponding to a cross-sectional shape of the groove 11 of the rail 10. For example, the slider 20 may be formed to be substantially T-shaped, and may include the support 21 configured to support the rotary shaft 40 and an insertion portion 22 connected to the support 21 in an orthogonal direction and configured to be inserted into the main groove 12 of the groove 11.

In the in-cabin partition according to the second example of the present disclosure, the rail 10 and the slider 20 may form a portion of the first driver 30. For example, the first driver 30 of the in-cabin partition according to the second example of the present disclosure may adopt a linear motor. To this end, a plurality of permanent magnets 31 may be arranged on the internal wall of the rail 10 in the longitudinal direction of the rail 10, and coils 32 may be wound and/or stacked on the insertion portion 22 of the slider 20.

In addition, the in-cabin partition according to the second example of the present disclosure may selectively further include a connection terminal 33, mounted on the slider 20 so as to be disposed between the rail 10 and the slider 20, which slides in contact with the rail 10, and which is electrically connected to the rail 10 through which the current flows. The connection terminal 33 may transmit the current applied from the rail 10 to the coil 32 of the slider 20 and supply the power source to the first driver 30.

The rotary shaft 40 may be formed of a tubular member that can be installed on the slider 20, for example, having a substantially circular cross section. In the in-cabin partition according to the second example of the present disclosure, the rotary shaft 40 may be installed parallel to the floor to be positioned over a plurality of sliders 20. For example, in order to implement stable support and operation of the rotary shaft 40, each of sliders 20 may be disposed in opposite ends of a single rotary shaft 40.

A bearing (not illustrated) rotatably supporting the rotary shaft 40 may be installed between the end of the rotary shaft 40 and the slider 20. Due to such a bearing, the rotary shaft 40 and the slider 20 may be somewhat spaced apart from each other, thus allowing for rotating the rotary shaft 40 smoothly without interference with the slider 20. The ring gear 63 may be formed on a portion of an inner circumferential surface of the rotary shaft 40. The ring gear 63 is relevant to the second driver 60.

The partition body 50 may be formed of, for example, a substantially plate-shaped member having a predetermined thickness. However, the shape of the partition body 50 is not necessarily limited thereto and may be formed to have any other shape.

One end of the partition body 50 may be fixedly coupled to the rotary shaft 40 using any technique such as welding or a fastener. Accordingly, the partition body 50 may perform a rotational motion corresponding to pitching around the rotary shaft 40.

As illustrated in FIGS. 7A, 7B and 8, the in-cabin partition according to the second example of the present disclosure may be rotated around the rotary shaft 40 disposed adjacent to the floor in the cabin 1, thus opening and closing the corridor in the cabin 1 as well as dividing the space in the cabin 1 into a passenger zone and a cargo zone.

A planetary gear mechanism may be adopted as the second driver 60 of the in-cabin partition according to the second example of the present disclosure. For example, the second driver 60 may include a drive motor 61, a sun gear 62, a ring gear 63, a plurality of planetary gears 64, a carrier 65, and a shaft member 66.

The drive motor 61 may be disposed adjacent to one end of the rotary shaft 40 on which the ring gear 63 is formed. In this case, the shaft member 66 for fixing the carrier 65 may be fixedly coupled to the other end of the rotary shaft 40 using any suitable technique, such as welding or a fastener.

When the sun gear 62 connected to the motor shaft of the drive motor 61 is used as an input shaft and the ring gear 63 is used as an output shaft, the planetary gears 64 whose positions are fixed rotate between the sun gear 62 and the ring gear 63 with the rotation of the sun gear 62, and the ring gear 63 may rotate along, thereby rotating the rotary shaft 40 integrated with the ring gear 63.

With the rotation of the rotary shaft 40 in this manner, the partition body 50 fixedly coupled to the rotary shaft 40 rotates as described above, thus opening and closing the corridor in the cabin 1 as well as dividing the space in the cabin 1.

The in-cabin partition according to the second example of the present disclosure may further include a controller 70 that controls operation of the first driver 30, the second driver 60, and the third driver 27, and selectively moves and/or rotates the in-cabin partition.

For example, before the operation of the mobility vehicle, a layout of the cabin 1 may be changed and an internal space may be redistributed and reconstructed depending on the number of passengers or the capacity of a cargo C input to the controller 70 in advance.

After adjusting the space for passengers, the controller 70 may control the first driver 30 of the in-cabin partition to linearly move the in-cabin partition along the rail 10 so that the in-cabin partition may be placed in an appropriate position within the cabin 1. After the position of the in-cabin partition is determined, the controller 70 may control the third driver 27 to operate the stud 25, thereby fixing the position of the in-cabin partition.

In addition, the controller 70 may control the second driver 60 and rotate the in-cabin partition to open the corridor in the cabin 1 for passenger boarding. In this case, the partition body 50 and the rotary shaft 40 may be laid parallel to the floor of the cabin 1.

After the passenger boarding is completed, the controller 70 may control the second driver 60 so that the partition body 50 rotates around the rotary shaft 40 and stands substantially upright, thus allowing the in-cabin partition to close the corridor and dividing the space in the cabin 1 into the passenger zone and the cargo zone. Accordingly, the cargo C may be loaded in the remaining space in the cabin 1.

According to the in-cabin partition according to the second example of the present disclosure, the time and process required for changing the layout in the cabin of the mobility vehicle may be significantly reduced.

Figure 9:
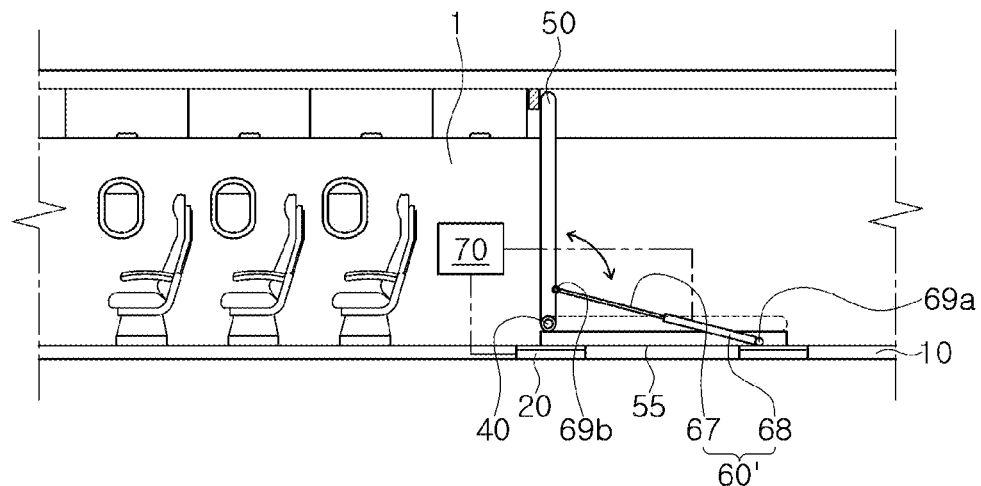
FIG. 9 is a side view of the in-cabin partition according to a third example of the present disclosure.

FIG. 9 is a side view of the in-cabin partition according to a third example of the present disclosure.

The in-cabin partition according to the third example of the present disclosure may include at least one rail 10, a slider 20, a rotary shaft 40, and a partition body 50.

The third example shown in FIG. 9 is different from the first example only in the configuration of the second driver 60' and the addition of a casing 55, and the remaining components in the third example are the same as those of the first example. Accordingly, in describing the in-cabin partition of the third example, the same reference numerals as the first example are assigned to the same components as the components the in-cabin partition according to the first example described above, and details of a configuration and a function thereof will be omitted.

The in-cabin partition according to the third example of the present disclosure may further include the casing 55 that accommodates the second driver 60' while rotatably supporting the rotary shaft 40 and is covered by the partition body 50.

The casing 55 is an approximately box-shaped member in which an upper surface thereof is opened, and may be installed parallel to the floor to be positioned over a plurality of sliders 20.

The rotary shaft 40 may be formed of a rod-shaped member that can be installed in the casing 55, for example, having a substantially circular cross-section. In the in-cabin partition according to the third example of the present disclosure, the rotary shaft 40 may be installed in the casing so as to get disposed parallel to the floor. For example, for stable support and rotation of the rotary shaft 40, opposite ends of the rotary shaft 40 may be hinge-coupled to sidewalls of the casing, respectively.

The partition body 50 may be formed of, for example, a substantially plate-shaped member having a predetermined thickness. However, the shape of the partition body 50 is not necessarily limited thereto and may be formed to have any other shape.

One end of the partition body 50 may be fixedly coupled to the rotary shaft 40 using any suitable technique, such as welding or a fastener. Accordingly, the partition body 50 may perform a rotational motion corresponding to the pitching around the rotary shaft 40.

As illustrated in FIG. 9, the in-cabin partition according to the third example of the present disclosure may be rotated around the rotary shaft 40 disposed adjacent to the floor in the cabin 1, thereby opening and closing the corridor in the cabin as well as dividing the space in the cabin into the passenger zone and the cargo zone.

When opening the corridor in the cabin, the partition body 50 may close an open surface of the casing 55 while being disposed parallel to the floor. While one surface of the partition body 50 is in contact with an edge of the open surface of the casing 55, the casing 55 may be covered by the partition body 50.

An electric actuator or a fluid pressure cylinder equipped with an operating rod 67 may be adopted as the second driver 60' of the in-cabin partition according to the third example of the present disclosure. For example, the second driver may include an operating body 68, and an operating rod 67 that can be inserted into and extended from the operating body 68 while operating by a fluid injected into the operating body 68 or an applied power source.

Furthermore, the second driver 60' may include a first hinge portion 69a formed in an end of the operating body 68 and a second hinge portion 69b formed in an end of the operating rod 67. By the first hinge portion 69a, the operating body 68 may be coupled to be relatively rotate with respect to the casing 55. By the second hinge portion 69b, the operating rod 67 may be coupled to be relatively rotate with respect to the partition body 50.

Accordingly, when the second driver 60' operates and rotates the partition body 50 almost upright around the rotary shaft 40, the operating rod 67 may be drawn out from the operating body 68 to a maximum length and may be elongated from the operating body 68. When the second driver 60 operates and rotates the partition body 50 in an opposite direction around the rotary shaft 40 so that the partition body 50 may cover the casing 55, the operating rod 67 may be drawn out from the operating body to a minimum length and may be contracted into the operating body 68.

As the rotary shaft 40 and the partition body 50 rotate as described, the in-cabin partition may open and close the corridor in the cabin 1 and divide the space in the cabin 1.

The in-cabin partition according to the third example of the present disclosure may further include a controller 70 that selectively moves and/or rotates the in-cabin partition by controlling the operations of the first driver 30, the second driver 60', and the third driver 27.

For example, before the operation of the mobility vehicle, the layout of the cabin 1 may be changed and the internal space may be redistributed and reconstructed depending on the number of passengers or the capacity of the cargo C input to the controller 70 in advance.

After adjusting the space for passengers, the controller 70 may control the first driver 30 of the in-cabin partition and linearly move the partition body 50 and the casing 55 along the rail 10 so that the partition body 50 and the casing 55 may be placed in an appropriate position within the cabin 1. After determining the positions of the partition body 50 and the casing 55, the controller 70 may control the third driver 27 to operate the stud 25, thereby fixing the position of the in-cabin partition.

In addition, the controller 70 may control the second driver 60' to allow the in-cabin partition to rotate to open the corridor in the cabin 1 for passenger boarding. In this case, the partition body 50 and the rotary shaft 40 may be laid parallel to the floor of the cabin, and the partition body 50 may cover the casing 55.

After the passenger boarding is completed, the controller 70 controls the second driver 60' so that the partition body 50 may rotate around the rotary shaft 40 and stand substantially upright, thus allowing the in-cabin partition to close the corridor and dividing the space in the cabin 1 into the passenger zone and the cargo zone. Accordingly, the cargo C may be loaded in the remaining space in the cabin 1.

According to the in-cabin partition according to the third example of the present disclosure, the time and process required for changing the layout in the cabin of the mobility vehicle may be significantly reduced.

Figure 10:
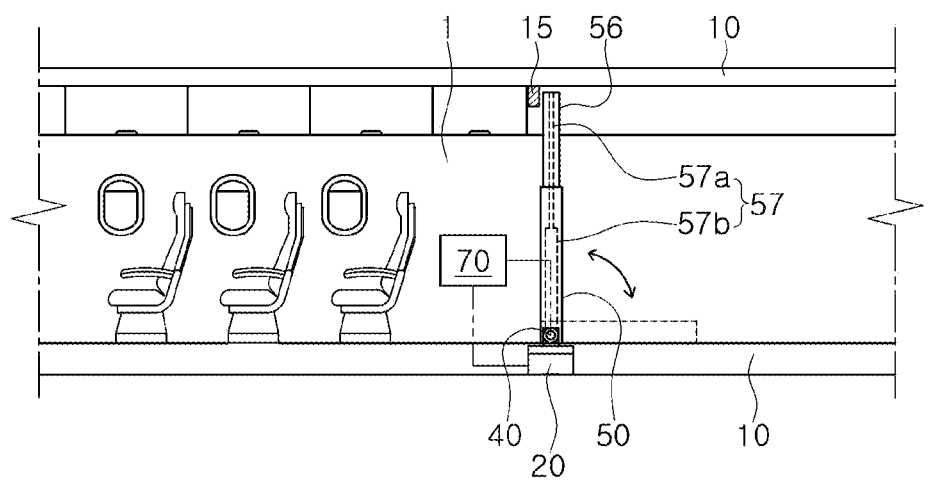
FIG. 10 is a side view of the in-cabin partition according to a fourth example of the present disclosure.

FIG. 10 is a side view of a partition in a cabin according to a fourth example of the present disclosure.

The in-cabin partition according to the fourth example of the present disclosure may include at least one rail 10, a slider 20, a rotary shaft 40, and a partition body 50.

The fourth example illustrated in FIG. 10 is different from the second example only in the addition of a partition elongating and contracting portion 56, and the remaining components in the fourth example are the same as those of the second example. Accordingly, in describing the in-cabin partition of the fourth example, the same reference numerals as the second example are assigned to the same components as the components of the in-cabin partition according to the second example described above, and details of a configuration and a function thereof will be omitted At least one rail 10 may be disposed on the floor of the cabin 1 in the longitudinal direction of the cabin 1.

In the in-cabin partition according to the fourth example of the present disclosure, the rail 10 may serve to guide the movement of the partition body 50 and form a portion of the first driver 30 to provide moving force to the partition body 50. Furthermore, the rail 10 may be electrically connected to the power source and configured to allow a current to flow through the rail 10 so that a current may be applied to a coil 32 of the first driver 30 through the slider 20.

The rail 10 may be installed on the ceiling or the sidewall of the cabin 1. In addition, optionally, multiple holders 15 may be disposed on the rail 10 at regular intervals in the longitudinal direction of the cabin 1. When the partition body 50 rotates and the partition elongating and contracting portion 56 is elongated and is in contact with one of the holders 15, the partition body 50 may be prevented from rotating at a predetermined angle or more, and an end of the partition elongating and contracting portion 56 may be supported by the holder 15.

The slider 20 may be inserted into the rail 10, that is, the main groove 12 of the groove 11, and may slide forwards and backwards in the groove 11 of the rail 10 in the longitudinal direction of the rail 10.

To this end, the slider 20 may have a cross-sectional shape corresponding to a cross-sectional shape of the groove 11 of the rail 10. For example, the slider 20 may be formed to be substantially T-shaped, and may include the support 21 configured to support the rotary shaft 40 and an insertion portion 22 connected to the support 21 in an orthogonal direction and configured to be inserted into the main groove 12 of the groove 11.

In the in-cabin partition according to the fourth example of the present disclosure, the rail 10 and the slider 20 may form a portion of the first driver 30. For example, the first driver 30 of the in-cabin partition according to the fourth example of the present disclosure may adopt a linear motor. To this end, the plurality of permanent magnets 31 may be arranged on the internal wall of the rail 10 in the longitudinal direction of the rail 10, and the coils 32 may be wound and/or stacked on the insertion portion 22 of the slider 20.

In addition, the in-cabin partition according to the fourth example of the present disclosure may selectively further include a connection terminal 33, mounted on the slider 20 so as to be disposed between the rail 10 and the slider 20, which slides in contact with the rail 10, and which is electrically connected to the rail 10 through which the current flows. The connection terminal 33 may transmit the current applied from the rail 10 to the coil 32 of the slider 20 and supply the power source to the first driver 30.

The rotary shaft 40 may be formed of a tubular member that can be installed on the slider 20, for example, having a substantially circular cross section. In the in-cabin partition according to the fourth example of the present disclosure, the rotary shaft 40 may be installed parallel to the floor to be positioned over a plurality of sliders. For example, in order to implement stable support and operation of the rotary shaft 40, each of sliders 20 may be disposed in opposite ends of a single rotary shaft 40.

A bearing (not illustrated) rotatably supporting the rotary shaft 40 may be installed between the end of the rotary shaft 40 and the slider 20. Due to such a bearing, the rotary shaft 40 and the slider 20 may be somewhat spaced apart from each other, thus rotating the rotary shaft 40 smoothly without interference with the slider 20. The ring gear 63 may be formed on a portion of the inner circumferential surface of the rotary shaft 40. The ring gear 63 is relevant to the second driver 60.

The partition body 50 may be formed of, for example, a substantially rectangular and/or cylindrical or arc shaped member having a hollow part (see, e.g., FIG. 8, FIG. 9, FIG. 10, etc.). However, the shape of the partition body 50 is not necessarily limited thereto and may be formed to have any other shape.

One closed end of the partition body 50 may be fixedly coupled to the rotary shaft 40 using any suitable technique, such as welding or a fastener. Accordingly, the partition body 50 may perform a rotational motion corresponding to the pitching around the rotary shaft 40.

The in-cabin partition according to the fourth example of the present disclosure may include a fourth driver 57 installed in the hollow portion of the partition body 50 and a partition elongating and contracting portion 56 which is connected to the fourth driver 57 and can be inserted into and extended from the other opened end of the partition body 50.

For example, an electric actuator or a fluid pressure cylinder equipped with an operating rod 57a may be adopted as the fourth driver 57. In the fourth driver 57, the operating rod 57a may be elongated and contracted by a fluid injected into or removed from an operating body 57b or an applied power source. According to the elongation and contraction of the operating rod 57a, the partition elongating and contracting portion 56 connected to the end of the operating rod 57a may be elongated from the partition body 50 or may be contracted into the partition body 50.

However, the fourth driver 57 is not necessarily limited to the above-described example and may be configured in any other form. For example, a rack and a pinion mechanism may be adopted along with a motor as the fourth driver 57. In other words, as long as a telescopic operation of the partition elongating and contracting portion 56 may be implemented, any other device may be adopted as the fourth driver 57.

As illustrated in FIG. 10, the in-cabin partition according to the fourth example of the present disclosure may be rotated around the rotary shaft 40 disposed adjacent to the floor in the cabin 1, thus opening and closing the corridor in the cabin 1 as well as dividing the space in the cabin 1 the passenger zone and the cargo zone.

A planetary gear mechanism may be adopted as the second driver 60 of the in-cabin partition according to the fourth example of the present disclosure. For example, the second driver 60 may include a drive motor 61, a sun gear 62, a ring gear 63, a plurality of planetary gears 64, a carrier 65, and a shaft member 66.

The drive motor 61 may be disposed adjacent to one end of the rotary shaft 40 on which the ring gear 63 is formed. In this case, the shaft member 66 for fixing the carrier 65 may be fixedly coupled to the other end of the rotary shaft 40 using any suitable technique, such as welding or a fastener.

When the sun gear 62 connected to the motor shaft of the drive motor 61 is used as an input shaft and the ring gear 63 is used as an output shaft, the planetary gears 64 whose positions are fixed rotate between the sun gear 62 and the ring gear 63 with the rotation of the sun gear 62, and the ring gear 63 may rotate, thereby rotating the rotary shaft 40 integrated with the ring gear 63.

With the rotation of the rotary shaft 40 in this manner, the partition body 50 fixedly coupled to the rotary shaft 40 may rotate as described above, thus opening and closing the corridor in the cabin 1 and dividing the space in the cabin 1.

The in-cabin partition according to the fourth example of the present disclosure may further include a controller 70 that controls operations of the first driver 30, the second driver 60, the third driver 27, and the fourth driver 57 and selectively moves and/or rotates, and elongates or contracts the in-cabin partition.

For example, before the operation of the mobility vehicle, the layout of the cabin 1 may be changed and the internal space may be redistributed and reconstructed depending on the number of passengers or the capacity of the cargo C input to the controller 70 in advance.

After adjusting the space for passengers, the controller 70 may control the first driver 30 of the in-cabin partition and linearly move the in-cabin partition along the rail 10 so that the in-cabin partition may be placed in an appropriate position within the cabin 1. After determining the position of the in-cabin partition, the controller 70 may control the third driver 27 to operate the stud 25, thereby fixing the position of the in-cabin partition.

In addition, the controller 70 may control the second driver 60 to rotate the in-cabin partition so as to open the corridor in the cabin 1 for passenger boarding. In this case, the partition body 50 and the rotary shaft 40 may be laid parallel to the floor of the cabin 1.

The controller 70 may control the second driver 60 so that the partition body 50 may rotate around the rotary shaft 40 and stand approximately upright (e.g., after completing passenger boarding). In addition, the controller 70 may control the fourth driver 57 to elongate the partition elongating and/or contracting portion 56 from the partition body 50, thus allowing the in-cabin partition to close the corridor and dividing the space in the cabin 1 into the passenger zone and the cargo zone. Accordingly, the cargo C may be loaded in the remaining space in the cabin 1.

According to the in-cabin partition according to the fourth example of the present disclosure, the time and process required for changing the layout in the cabin of the mobility vehicle may be significantly reduced.

As described above, according to an example of the present disclosure, a single mobility vehicle may be utilized for various purposes, thereby reducing costs and maximizing profits.

Although examples of the present disclosure have been described for illustrative purposes, those skilled in the art will appreciate that various changes and modifications are possible, without departing from essential characteristics of the disclosure. Further, the various examples and features thereof are not necessarily mutually exclusive and can be combined.

The present disclosure provides an in-cabin partition of a mobility vehicle for automatically adjusting a size of a space for passengers and cargo according to circumstances and needs.

The in-cabin partition may include at least one rail installed in a cabin; a slider movably installed on the rail, a rotary shaft rotatably installed on the slider, and a partition body that is connected to the rotary shaft and configured to be rotatable with the rotary shaft.

The in-cabin partition may further include a first driver installed on the rail and the slider to provide moving force to the slider, a second driver installed on the slider to provide rotational force to the rotary shaft, and a controller that is configured to control operations of the first driver and the second driver.

The rail may include a groove formed to extend in a longitudinal direction thereof. The groove may include a main groove and a separation prevention groove formed in a direction crossing the main groove and extending in the longitudinal direction of the rail. The slider may include a flat support configured to support the rotary shaft and an insertion portion connected to the support orthogonally and inserted into the main groove. The insertion portion may include a separation prevention portion formed to protrude from the insertion portion and configured to be insertable into the separation prevention groove.

A plurality of locking grooves spaced apart from each other at intervals in a longitudinal direction of the rail may be formed in at least one front end of the groove. The support may include a hollow portion, a position fixing unit installed to appear outside or disappear inside the hollow portion, and at least one through-hole formed on one side surface thereof. The position fixing unit may include at least one stud, a frame connected to the stud, and a third driver installed in the hollow portion to provide driving force for moving the frame. The stud may be inserted into one of the plurality of locking grooves through the through-hole.

The first driver may comprise a linear motor. One of the rail and the slider may include a plurality of permanent magnets arranged in the longitudinal direction, and the other thereof may be provided with coils that are wound or stacked.

The in-cabin partition may include a connection terminal mounted on the slider and configured to slide while coming into the contact with the rail, and electrically connected to the rail through which a current may flow. The connection terminal may be electrically connected to the first driver and the second driver.

The second driver may include a drive motor installed on the slider, a sun gear connected to a motor shaft of the drive motor, a ring gear formed on an inner circumferential surface of the rotary shaft, a plurality of planetary gears configured to rotate the ring gear while the sun gear and the ring gear are engaged and a carrier that is configured to connect the plurality of planetary gears and to fix a position thereof within the rotary shaft by an axis member.

The rotary shaft may be installed upright on the slider or positioned over the plurality of sliders.

The rotary shaft may be installed to be positioned over the plurality of sliders. The partition body may be formed to have the hollow portion and one end of the partition body may be fixedly coupled to the rotary shaft. The in-cabin partition may include a fourth driver installed in the hollow portion of the partition body and a partition elongating and contracting portion connected to the fourth driver and configured to be inserted into and extended from the other end of the partition body.

The in-cabin partition may also or alternatively include at least one rail installed in a cabin, a plurality of sliders movably installed on the rail, a casing installed to be positioned over the plurality of sliders, a rotary shaft rotatably installed in the casing and a partition body that is connected to the rotary shaft and configured to be rotatable with the rotary shaft.

The in-cabin partition may further include a first driver installed on the rail and the slider to provide moving force to the slider, a second driver installed to be accommodated in the casing to provide rotational force to the rotary shaft, and a controller that is configured to control operations of the first driver and the second driver.

The second driver may include an operating body and an operating rod. The operating rod may be configured to be inserted into and extended from the operating body by operating with a fluid injected into the operating body or an applied power source. A first hinge portion may be formed in an end of the operating body so that the operating body is coupled to the casing to rotate relatively to the casing. A second hinge portion may be formed in an end of the operating rod so that the operating rod is coupled to the partition body to rotate relatively to the partition body.

For example, the aforementioned and illustrated examples of the present disclosure may be combined with each other, each of which may optionally further adopt or replace some of the components of other examples as needed.

Accordingly, the examples disclosed in the present disclosure are intended to illustrate the scope of the technical idea of the present disclosure, and the scope of the present disclosure is not limited by the examples. The scope of the present disclosure shall be construed on the basis of the accompanying claims in such a manner that all of the technical ideas included within the scope equivalent to the claims belong to the present disclosure.

What is claimed is:

1. An in-cabin partition comprising:
   a rail installed in a cabin;
   a slider movably coupled to the rail;

a rotary shaft rotatably coupled to the slider;
a partition body connected to the rotary shaft and configured to be rotatable with the rotary shaft, wherein the partition body comprises a hollow portion, and one end of the partition body is fixedly coupled to the rotary shaft;
a first driver, coupled to the rail and coupled to the slider, and configured to provide moving force to the slider;
a second driver coupled to the slider and configured to provide rotational force to the rotary shaft;
a controller configured to control an operation of one or more of the first driver or the second driver;
a connection terminal, mounted on the slider, configured to slide in contact with the rail, and electrically connected to the rail through which a current flows;
a third driver disposed in the hollow portion of the partition body; and
a partition elongating and contracting portion connected to the third driver and configured to be inserted into or extended from the other end of the partition body,
wherein the third driver comprises an operating body and an operating rod, and
wherein the operating rod is connected to the partition elongating and contracting portion at an end and is configured to retract into or extend from the operating body based on at least one of:
a fluid injected into or removed from the operating body, or
an applied power source.

2. The in-cabin partition according to claim 1, wherein the rail forms a groove that extends in a longitudinal direction of the rail,
wherein the groove has a shape that forms:
a main groove extending in a first transverse direction of the rail and extending in the longitudinal direction of the rail; and
a separation prevention groove extending in a second transverse direction of the rail, wherein the second transverse direction crosses the first transverse direction, and extending in the longitudinal direction of the rail,
wherein the slider comprises:
a support configured to support the rotary shaft, and
an insertion portion connected to the support orthogonally and configured to be inserted into the main groove, wherein the insertion portion comprises a separation prevention portion formed to protrude from the insertion portion and configured to be insertable into the separation prevention groove.

3. The in-cabin partition according to claim 2, wherein a plurality of locking grooves spaced apart from each other at intervals in the longitudinal direction of the rail are formed in at least one edge of the groove,
wherein the support comprises a hollow portion and a position fixing unit configured to extend outside of the hollow portion or retract inside the hollow portion, and wherein at least one through-hole is formed in a side surface of the support,
wherein the position fixing unit comprises at least one stud and a frame connected to the stud, and wherein a third driver is provided in the hollow portion and configured to provide driving force for moving the frame, and
wherein the at least one stud is configured to be inserted into at least one of the plurality of locking grooves through the at least one through-hole.

4. The in-cabin partition according to claim 1, wherein the first driver comprises a linear motor, and
wherein one of the rail or the slider comprises a plurality of permanent magnets arranged in a longitudinal direction of the rail, and the other of the rail or the slider comprises coils that are wound or stacked, and
wherein the plurality of permanent magnets and the coils form the linear motor.

5. The in-cabin partition according to claim 1, wherein the second driver comprises:
a drive motor coupled to the slider;
a sun gear connected to a motor shaft of the drive motor;
a ring gear formed on an inner circumferential surface of the rotary shaft;
a plurality of planetary gears configured to rotate the ring gear while the sun gear and the ring gear are engaged; and
a carrier configured to connect the plurality of planetary gears and to fix a position of the planetary gears within the rotary shaft via an axis.

6. The in-cabin partition according to claim 1, wherein the rotary shaft extends upright from the slider.

7. The in-cabin partition according to claim 1, further comprising:
a plurality of sliders comprising the slider, wherein the rotary shaft is positioned over the plurality of sliders.

8. The in-cabin partition according to claim 1, wherein the rail comprises a conductive material and is electrically connected to a power source,
wherein the first driver comprises a linear motor,
wherein the rail comprises a plurality of permanent magnets arranged in a longitudinal direction of the rail, and the slider comprises coils that are wound or stacked,
wherein the plurality of permanent magnets and the coils form the linear motor, and
wherein the connection terminal is configured to be electrically connected to the rail, the coils and the second driver, to transmit the current applied from the rail to the coils and the second driver, and to slide with the slider.

9. The in-cabin partition according to claim 1, wherein the partition elongating and contracting portion, when extended from the other end of the partition body, and the partition body are configured to form a partition between divided spaces of a cabin.

10. An in-cabin partition comprising:
a rail installed in a cabin;
a rotary shaft;
a plurality of sliders comprising a slider movably coupled to the rail, wherein the rotary shaft is positioned over the plurality of sliders, and wherein the rotary shaft is rotatably coupled to the slider;
a partition body connected to the rotary shaft and configured to be rotatable with the rotary shaft, wherein the partition body comprises a hollow portion, and one end of the partition body is fixedly coupled to the rotary shaft;
a first driver, coupled to the rail and coupled to the slider, and configured to provide moving force to the slider;
a second driver coupled to the slider and configured to provide rotational force to the rotary shaft;
a controller configured to control an operation of one or more of the first driver or the second driver,
a third driver in the hollow portion of the partition body; and a partition elongating and contracting portion connected to the third driver and configured to be inserted into or extended from the other end of the partition body, wherein the third driver comprises an operating body and an operating rod, and wherein the operating rod is connected to the partition elongating and contracting portion at an end, and is configured to retract into or extend from the operating body based on at least one of:

a fluid injected into or removed from the operating body, or an applied power source.

11. The in-cabin partition according to claim 10, further comprising:

a connection terminal coupled to the slider so as to contact the rail, wherein the rail comprises a conductive material and is electrically connected to a power source, wherein the first driver comprises a linear motor, wherein the rail comprises a plurality of permanent magnets arranged in a longitudinal direction of the rail, and the slider comprises coils that are wound or stacked, wherein the plurality of permanent magnets and the coils form the linear motor, and wherein the connection terminal is configured to be electrically connected to the rail, the coils and the second driver, to transmit a current applied from the rail to the coils and the second driver, and to slide with the slider.

12. The in-cabin partition according to claim 11, wherein the connection terminal is electrically connected to the first driver and to the second driver.

13. The in-cabin partition according to claim 10, wherein the partition elongating and contracting portion, when extended from the other end of the partition body, and the partition body are configured to form a partition between divided spaces of a cabin.

* * * * *